United States Patent
Zimmermann et al.

[11] Patent Number: 5,975,873
[45] Date of Patent: Nov. 2, 1999

[54] DEVICE FOR LAYING A FILM EMERGING FROM A SLOT DIE ONTO A ROTATING TAKE-OFF ROLL

[75] Inventors: Uwe Zimmermann, Hainau; Harald Mueller, Taunusstein; Detlef Wacker, Mainz, all of Germany

[73] Assignee: Hoechst Diafoil GmbH, Weisbaden, Germany

[21] Appl. No.: 08/988,528

[22] Filed: Dec. 10, 1997

[30] Foreign Application Priority Data

Dec. 20, 1996 [DE] Germany ............... 196 53 749

[51] Int. Cl.$^6$ ............... B29C 39/42; B29D 7/01
[52] U.S. Cl. ............... 425/174.8 E; 264/216; 264/467; 425/377
[58] Field of Search ............... 425/174.8 E, 377; 264/216, 467

[56] References Cited

U.S. PATENT DOCUMENTS

| Re. 27,771 | 10/1973 | Owens et al. | 264/467 |
| 3,655,307 | 4/1972 | Hawkins | 425/109 |
| 3,820,929 | 6/1974 | Busby et al. | 425/174.8 E |
| 5,494,619 | 2/1996 | Zaretsky et al. | 264/466 |

FOREIGN PATENT DOCUMENTS

| 245 108 | 11/1987 | European Pat. Off. . |
| 306 842 | 3/1989 | European Pat. Off. . |
| 707 940 | 4/1996 | European Pat. Off. . |
| 58-163624 | 9/1983 | Japan ............... 264/467 |
| WO95/21735 | 8/1995 | WIPO . |

OTHER PUBLICATIONS

Patent Abstract of Japan Publication No. 09141728, (Jun. 3, 1997).

Patent Abstract of Japan Publication No. 02164517 (Jun. 25, 1990).

Patent Abstract of Japan Publication No. 63317316 (Dec. 26, 1988).

*Primary Examiner*—Leo B. Tentoni

[57] ABSTRACT

A device for laying a film 3 emerging from a slot die 2 onto a take-off roll 1 has at least one electrode that is arranged parallel to and at a short distance from the surface of the take-off roll 1 and to which electric voltage in the range from 4 to 12 kV is applied. This electrode is, for example, a metal strip 4, which has a tapering strip edge 6 this is directed toward the surface of the take-off roll 1. In addition to this metal strip 4, one or a plurality of electrodes 5, 8 and 16 are arranged at a distance from the surface of the take-off roll. These additional electrodes have applied to them an electric voltage whose magnitude is the same as or different from that applied to the metal strip 4. As a result, additive electric fields to the electric field of the one metal-strip electrode are formed.

32 Claims, 8 Drawing Sheets

DEVICE FOR LAYING A FILM EMERGING FROM A SLOT DIE ONTO A ROTATING TAKE-OFF ROLL

FIELD OF THE INVENTION

The invention relates to a device for laying a film emerging from a slot die onto a rotating take-off roll, having at least one electrode that is arranged parallel to and at a short distance from the surface of the take-off roll, and to which electric voltage is applied.

BACKGROUND OF THE INVENTION

In the production of films, in particular stretched very thin and thin films with thicknesses between 1 μm and 30 μm, plastic granules are first melted in an extruder, and the extruded plastic melt is fed to a slot die. The prefilm emerging from this slot die is laid onto a take-off and chill roll and, after leaving the take-off roll, is stretched in and transverse to the machine-running direction in a stretching frame.

In order to stabilize the laying of the prefilm onto the take-off roll, in the prior art additional forces are applied to the prefilm in the region between the emergence of the prefilm from the slot die and the point at which it is laid on the take-off roll. The additional forces applied can be produced using an air jet from an air knife to blow against the prefilm, the spraying of water into the gore of the prefilm before the point at which it is laid on the take-off roll, the formation of a water film on the take-off roll and the generation of an electric field by means of an electrode at high voltage, the field lines of the electric field being directed toward the surface of the take-off roll. The forces additionally applied are used for the lateral outward displacement of air enclosed between the surface of the take-off roll and the underside of the prefilm, that is the side of the prefilm facing the take-off roll, under the gore of the prefilm before the prefilm is laid onto the take-off roll, in order in this way to stabilize the laying of the prefilm onto the roll surface over a predefined wrap angle. If this is not successful, air inclusions that are more or less large, so-called "pinning" bubbles are produced, which are located between the underside of the prefilm and the surface of the take-off roll, and impair the smoothness and thus the quality of the prefilm cooled down on the take-off roll, as well as the film biaxially stretched therefrom.

It is known to arrange a metal strip made of stainless steel parallel to the take-off roll surface as electrode, the metal strip generally being stamped out or cut out from a metal foil of about 20 μm thickness in a width of 10 mm. A metal strip of this type has the disadvantage that it cannot absorb sufficiently high clamping forces, which are necessary to clamp the metal strip with the desired accuracy at a uniform distance from the take-off roll. Furthermore, it is disadvantageous that the edges of the metal strip produced by the cutting or stamping process are irregular, with the result that the electric field between the metal strip and the take-off roll is distorted. These distortions of the electric field are also further amplified on account of an irregular spacing of the metal strip from the take-off roll surface. The distortions of an electric field lead on the one hand to electric flashovers, as a result of which the prefilm can be damaged, and on the other hand to a nonuniform laying of the prefilm onto the take-off roll, as a result of which air inclusion between the prefilm and the take-off roll can continue to occur. The distortions of the electric field overall do not lead to the desired film quality.

The PCT Application WO 95/21735 (German Utility Model G 94 02 027) discloses a device for the production of films, in particular thin or very thin films, having a rotating roll, using which a plastically deformable film, preferably supplied through a slot die, is conveyed and oriented, an electric voltage, through which the supplied film is laid onto the roll, being applied between the roll and a metal strip that is arranged parallel to and at a short distance from the roll; in this device the metal strip has a sharp longitudinal edge which is arranged lying next to the roll and is directed toward the latter. The sharp longitudinal edge is constructed in the manner of a cutting edge on a sharply tapering region of the metal strip, the metal strip being arranged lying next to the roll at a distance smaller than 6 mm. The center line of the sharply tapering region is aligned with the center of the roll. The use of such a metal-strip electrode improves the film quality, but not to the desired extent, since although the air inclusions become smaller in their diameters and fewer in their number, this is in no way to the extent which is sought.

U.S. Pat. No. 5,494,619 discloses an electrostatic pinning process in which a wire electrode is arranged between an extrusion die and a take-off roll. A shield at bias voltage is located between the extrusion die and the wire electrode. The bias voltage of the shield is 1 to 10 kV, whereas a voltage of 6 to 15 kV is applied to the wire electrode. In the case of this process, it is essential to apply the highest possible electrostatic charge to the film to be laid onto the take-off roll, in comparison with an arrangement in which the shielding is at ground potential. To this end, there is an optimum bias voltage of the shield, which depends on the voltage of the wire electrode, but differs significantly from the latter and from ground potential. The net current or the electrostatic charge to the film results from the difference between the current from the wire electrode and a previously measured current to the shield, which is obtained by applying voltage to the shield and the wire electrode being at ground potential. For a predefined voltage, which is applied to the wire electrode, a high current generation results from a low electric voltage on the shielding, but also a great number of field lines, the majority of which end on the shield and not on the film. By increasing the voltage on the shield, the current decreases, but more field lines end on the film, as a result of which the major part of the current is deflected onto the film. The overlaying of two electrostatic fields does not take place, since the electrically biased shield serves to deflect field lines directed toward it from the wire electrode in the direction of the film.

The object of the invention is to develop further and to improve a device of the type described at the beginning in such a way that the air inclusions become significantly smaller and fewer than in the case of laying devices for films known in the prior art.

SUMMARY OF THE INVENTION

The invention relates to a device for laying a film emerging from a die slot onto a rotating take-off roll, and having at least one electrode that is arranged parallel to and at a short distance from the surface of the take-off roll, and to which electrode a voltage is applied.

Further, the object of the invention is achieved in that, in addition to the one electrode, one or more electrodes are arranged at a distance from the surface of the take-off roll, have applied to them an electric voltage whose magnitude is the same as or different from that applied to the one electrode, and form corresponding additive electric fields to the electric field of the one electric electrode.

In the case of one embodiment of the invention for laying a film emerging from a slot die onto a rotating take-off roll, having at least one metal strip that is arranged parallel to and at a short distance from the surface of the take-off roll, and to which electric voltage is applied, a further metal strip of the same type, to which electric voltage is applied, is arranged parallel to the one metal strip, the two metal strips forming a double strip and being connected to the same power source and in each case having a tapering strip edge that is directed toward the surface of the take-off roll. In a refinement of the invention, the distance between the strip edges of the metal strips is 0.1 to 15 mm, and the voltage applied to the double strip lies in the range from 4 to 12 kV. This laying device having a double strip made of two metal strips as electrodes can further be supplemented by a further electrode, which is arranged above the double strip, an electric voltage additional to the electric voltages of the two metal strips being applied to this electrode. Expediently, the voltage applied to the electrode lies in the range from 5 kV to 15 kV.

In a development of the invention, the electrode is an annular electrode of circular cross section which has a diameter of 10 to 100 mm, in particular of 75 mm, and the electrode is arranged 3 to 30 mm perpendicularly above the point where the film is laid onto the take-off roll.

In a further refinement of the invention, the laying device, instead of three electrodes, has only two electrodes, an electrode to which a voltage additional to the electric voltage of the metal strip electrode is applied being arranged between the slot die and a single electrode made of a metal strip, and this electrode is located 3 to 30 mm perpendicularly above the point where the film is laid onto the take-off roll. Expediently, the electrode is an annular electrode of circular cross section, which is arranged 3 to 30 mm above the point where the film is laid onto the take-off roll, and the diameter of the electrode is 10 to 100 mm.

In another embodiment, the electrode is a disk-shaped electrode, which is screwed by means of a cylindrical screw to an intermediate piece that is connected to a ribbed insulator which, with the aid of a second cylindrical screw, is fastened to a relatively long link piece, and a shorter link piece is connected to a holder, which is mounted in a height-adjustable and horizontally adjustable carriage.

The advantage achieved with the invention is that, in the case of using additive electric fields, for example by means of employing a second or third electrode in addition to the first electrode for laying the film onto the take-off roll, the number of air inclusions decreases considerably, and the diameters of the individual air inclusions are on average between 23 and 39% smaller than when employing a single electric laying field.

DETAILED DESCRIPTION OF THE INVENTION

Figure 1:
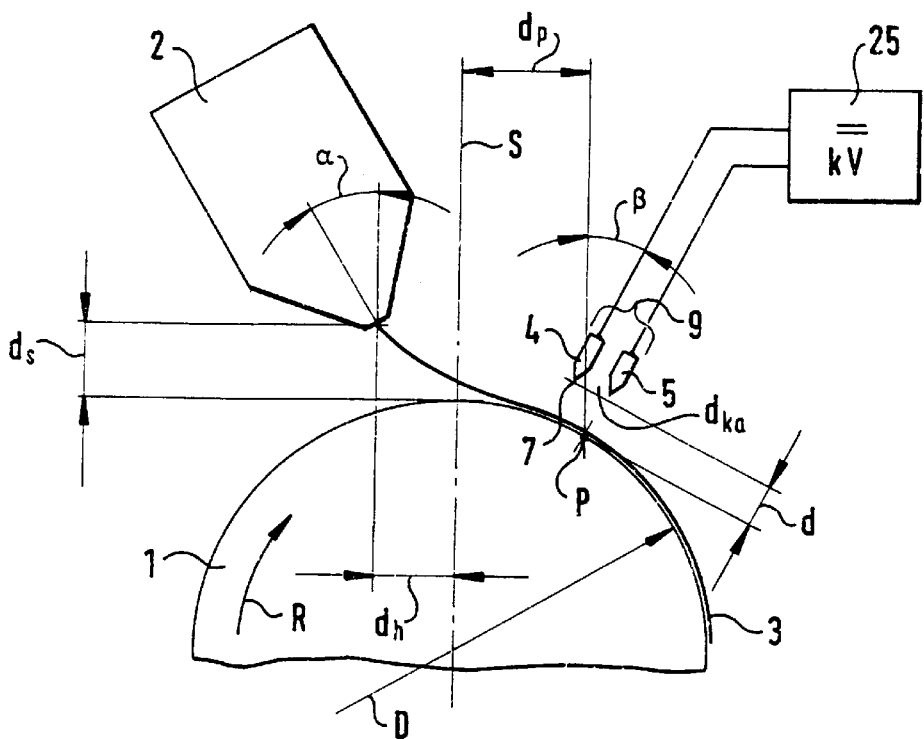
FIG. 1 shows, in a schematic view, a first embodiment of a laying device for a film according to the invention, having a double strip made of two metal strips as electrodes.

The schematic view in FIG. 1 shows a take-off roll 1 with a diameter D which is 600 to 1800 mm. A film 3 is extruded from a slot die 2, and has a parabola-shaped course between the exit slot of the slot die 2 and a laying-on point P on the surface of the take-off roll 1. This film 3 is a so-called prefilm, which has a thickness between 0.015 and 2.5 mm and a width up to 3 m. This film 3 is transported further on the take-off roll 1, which is also a chill roll at the same time, and subsequently passes into a stretching or orienting frame, not shown, in which the film 3 is stretched in and transverse to the machine running direction. The slot die 2 has a width in the range from 0.2 to 2.9 m, in particular of more than 2 m.

The axis of the slot die 2 is inclined at an angle $\alpha$ to a vertical S through the vertex of the take-off roll 1. The angle $\alpha$ lies in the range from 20° to 40°, and in particular a is equal to 30°. The vertical distance $d_s$ of the exit slot of the slot die 2 from the vertex of the take-off roll 1 is 15 to 90 mm, in particular 70 mm. The same is true for the horizontal distance $d_h$ between the exit slot of the slot die 2 and the vertical S. The distance $d_h$ is 0 to 90 mm, in particular 70 mm. At a distance d=3 to 6 mm from the surface of the take-off roll 1, viewed in the direction of rotation R of the take-off roll 1, there are arranged in front of the laying-on point P two metal strips 4 and 5 as electrodes (a first electrode and second electrode, respectively), which together form a so-called double strip 9. The two metal strips 4 and 5 are of the same type and parallel to each other and connected to the same first power source 25, which is a high-voltage source for direct current, which applies a direct voltage of the order of magnitude of 4 to 12 kV with a current capacity of about 1 to 10 mA to the two metal strips 4 and 5. The distance $d_{ka}$ between the strip edges 6 and 7 is 0.10 to 15 mm, and preferably 3 mm. The double strip 9 or the two metal strips 4 and 5 are inclined with respect to the vertical S through the vertex of the take-off roll 1 by the angle $\beta$, which lies in the range from 20 to 40° and is, in particular, 30°. The horizontal distance $d_p$ of the metal strip 4 lying closer to the vertical S from the vertical S is 30 to 100 mm and, in particular, 90 to 95 mm.

The influence on the geometry of the pinning bubbles of the film 3 of the additive electric field, which acts on the film 3 via the second metal strip 5 in addition to the electric field of the first metal strip 4, in comparison to the influence of an electric field of the metal strip 4 acting on its own on the film, given otherwise identical conditions, has been investigated and it is described in more detail below using FIGS. 6a to 6d.

Figure 2:
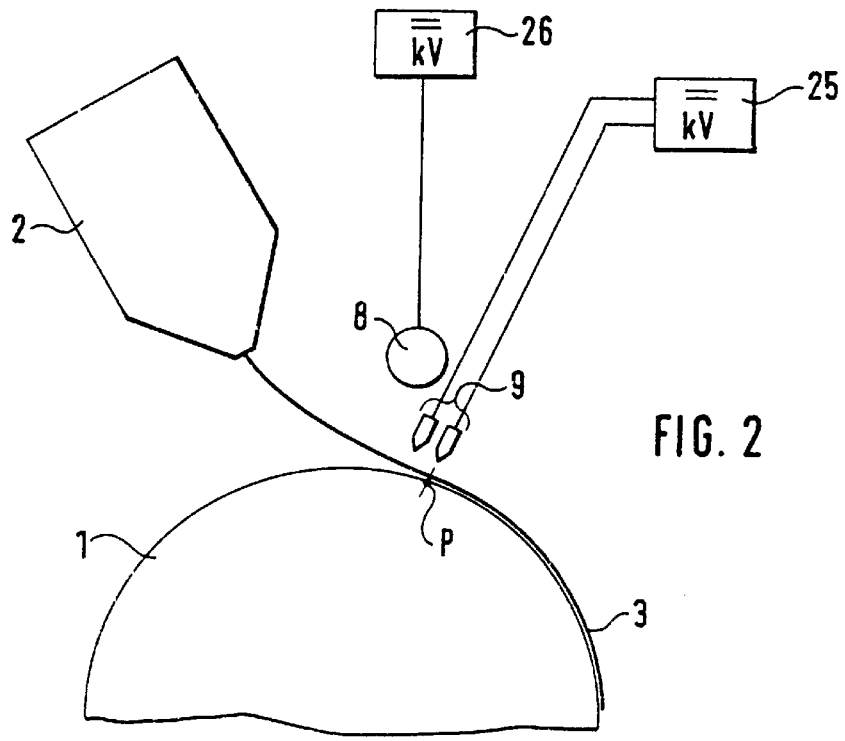
FIG. 2 shows a second embodiment of a laying device according to the invention, in which a further electrode is present in addition to the double strip.

Shown schematically in FIG. 2 is a second embodiment of a laying device according to the invention, which differs with respect to the first embodiment according to FIG. 1 only in that, in addition to the double strip 9, there is a further third electrode 8, which is connected to a separate, second high-voltage power source 26, which applies a voltage in the range from 5.0 kV to 15 kV to the electrode 8. This electrode 8 is an annular electrode of circular cross section, which has a diameter of 10 to 100 mm, in particular of 75 mm. This electrode 8 is arranged 5 to 30 mm, preferably 20 mm, vertically above the point P at which the film 3 is laid onto the take-off roll 1. The distance of the additional electrode 8 from the take-off roll 1 depends on the magnitude of the high voltage applied to the electrode 8. In this case, the distance is selected such that flashovers are avoided to a large extent, since these would lead to a considerable reduction in the quality of the film. The path of the melt film from the slot die 2 until it is laid onto the take-off roll 1 is not altered by connecting up a further additive electric field by means of the electrode 8. By means of the additional additive electric field of the electrode 8, the laying-on force on the melt film is increased, which results in a distinct improvement in the prefilm quality with regard to pinning bubbles, which is made noticeable in that the number of pinning bubbles reduces considerably, likewise the size of these air inclusions.

Figure 3:
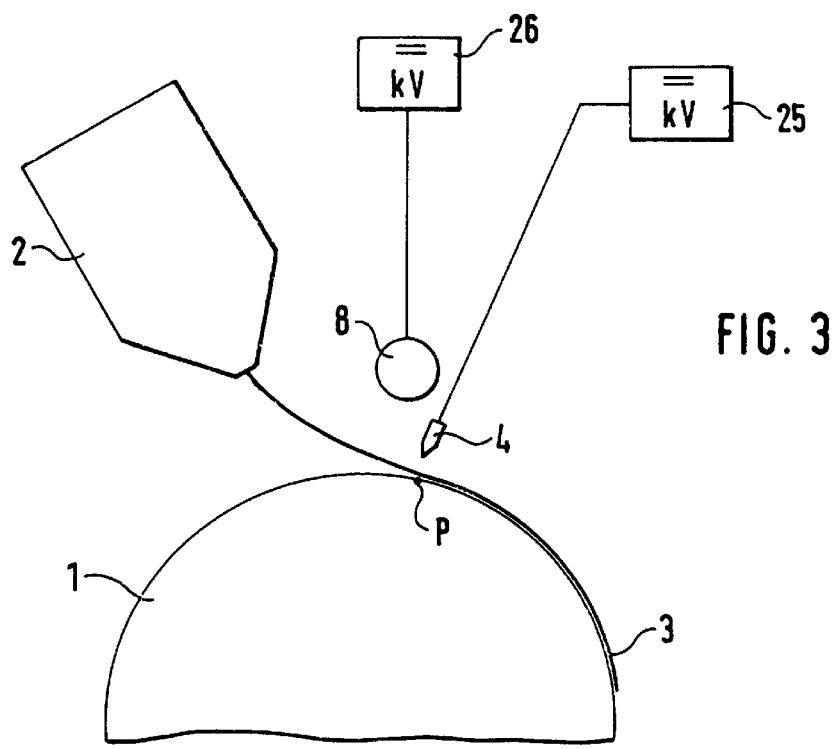
FIG. 3 shows a third embodiment of a laying device according to the invention, which comprises a single metal strip and a further electrode.

Shown in FIG. 3 is a third embodiment of a laying device, which comprises a single metal strip 4 in combination with a further electrode 8. In this embodiment, too, the laying-on force on the melt film before it encounters the take-off roll 1 is increased by the additive electric field of the electrode 8. The electrode 8, just as in the case of the second embodiment of the laying device, has applied to it a direct voltage in the range from 5 kV to 15 kV from a high-voltage source 26. The metal strip 4 is connected to a high-voltage source 25, which applies a direct voltage in the range from 4 to 12 kV to this strip electrode. The electrode 8 is likewise an annular electrode of circular cross section, and is located 3 to 30 mm vertically above the point where the film 3 is laid onto the take-off roll 1. The preferred distance is 20 mm. The diameter of the electrode 8 is 10 to 100 mm, in particular 75 mm.

Figure 4:
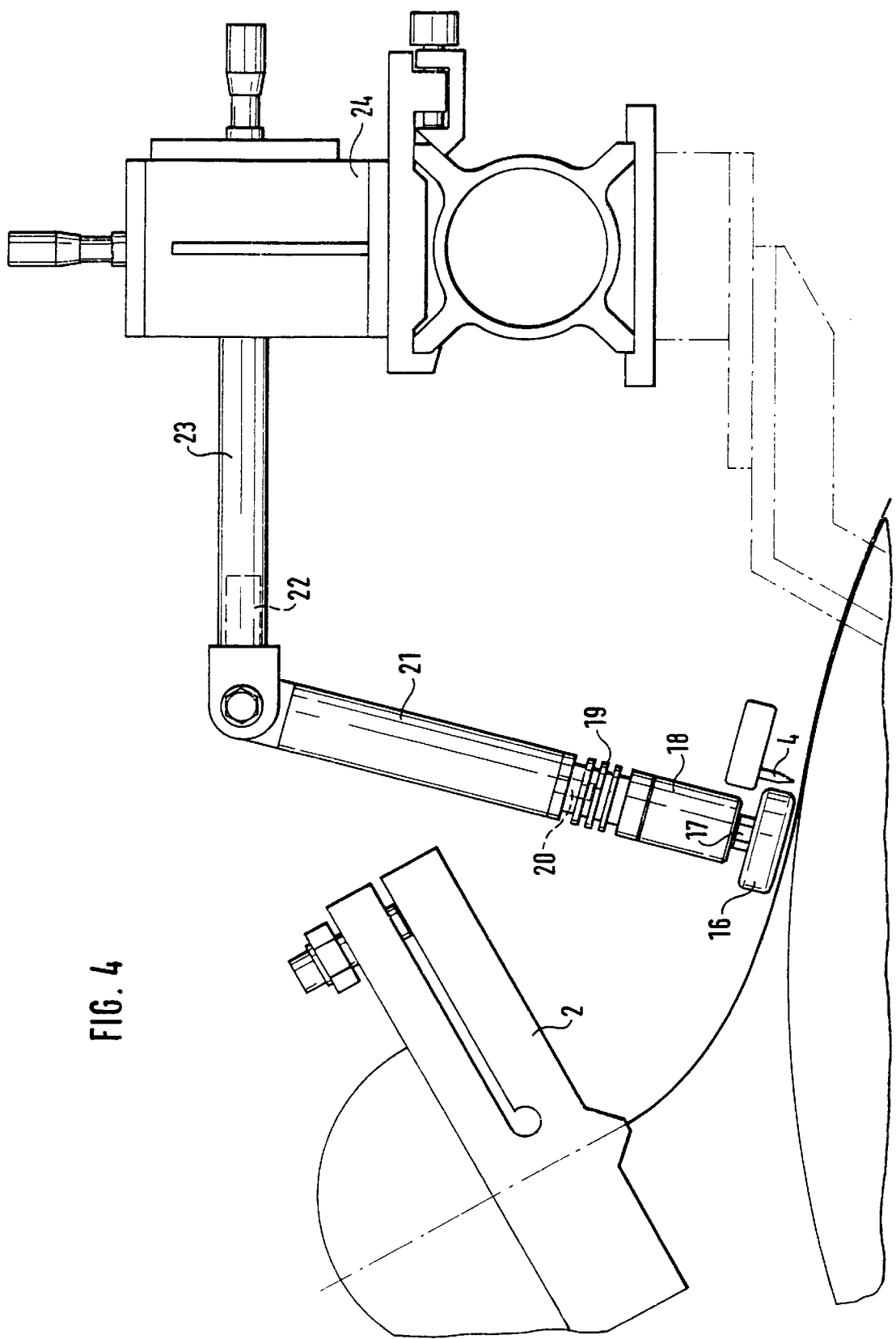
FIG. 4 shows a fourth embodiment of a laying device according to the invention, which comprises a single metal strip and an electrode modified with respect to FIG. 3.

A fourth embodiment of a laying device for the film onto the take-off roll 1 is shown in FIG. 4. This laying device comprises a metal strip 4 and a disk-shaped electrode 16 arranged directly in front of the metal strip 4. The distance of this disk-shaped electrode 16 from the surface of the take-off roll 1 can be adjusted in the range from 3 to 12 mm. The disk-shaped electrode 16 is screwed by means of a cylindrical screw 17 to an intermediate piece 18 that is connected to a rib insulator 19. One piece of this electrode fastening is a link, which comprises a longer link piece 21 and a shorter link piece 22. The ribbed insulator 19 is screwed by means of a further cylindrical screw 20 to the longer link piece 21. The shorter link piece 22 is connected to a holder 23, which is mounted in a height-adjustable and horizontally adjustable carriage 24. The carriage 24 can be moved on rails, which are fitted along the machine running direction of the film installation. A voltage in the range from 5 to 15 kV is applied to the disk-shaped electrode 16 by a high-voltage source that is not shown. The distance of the electrode 16 from the surface of the take-off roll 1 is in this case set to 3 to 12 mm.

Figure 5:
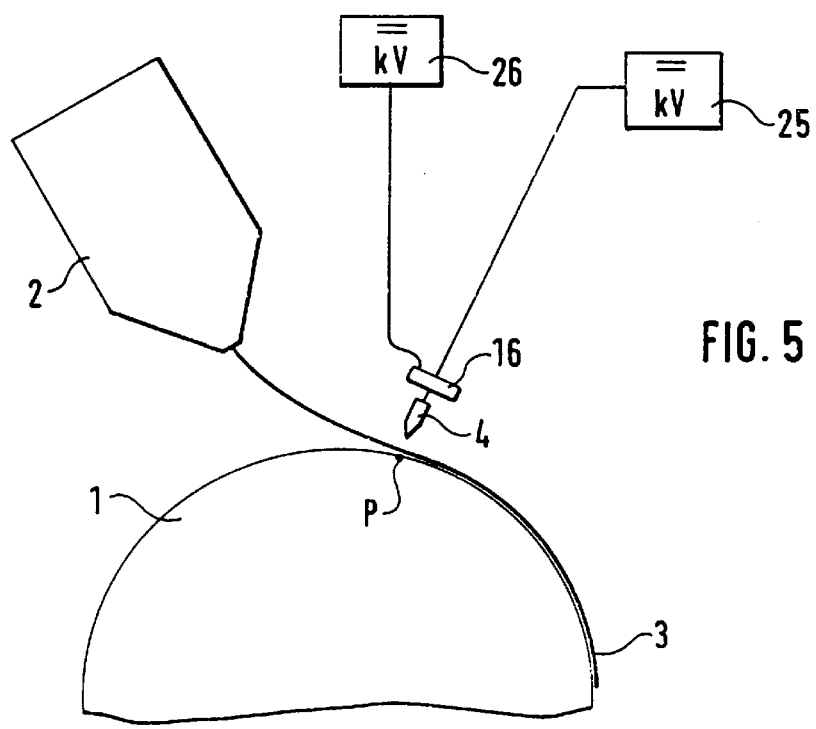
FIG. 5 shows a fifth embodiment of a laying device according to the invention, which has an electrode arrangement changed with respect to FIG. 4.

The embodiment of the laying device shown in FIG. 5 differs from the embodiment according to FIG. 4 only in the mutual location of the electrodes 4 and 16. The disk-shaped fourth electrode 16 is in this case located above the metal strip 4 and not in front of the metal strip as in FIG. 4. The distance of the electrode 16 from the surface of the take-off roll 1 is 15 to 30 mm, and a voltage of 12 to 25 kV is applied to the electrode 16. The metal strip 4 is spaced 3 to 12 mm from the surface of the take-off roll 1, and the voltage applied to the metal strip 4 is 4 to 12 kV.

FIGS. 6a to 6d show the geometries of the pinning bubbles from selected samples of a prefilm which, on the one hand, is laid onto the take-off roll 1 on the one hand by means of a laying device comprising a single metal-strip electrode and, on the other hand, with the aid of a laying device comprising a double strip 9 made of two metal-strip electrodes according to the first embodiment according to FIG. 1.

The film strip running speeds are 100 m/min and 120 m/min. Further information about the parameters of the laying device is to be compared, and the samples examined, emerge from the following Tables 1 and 2.

The values of Table 1 relate to the single metal strip electrode as laying device.

TABLE 1

| Sample # | Direct current V kV | I mA | $d_s$ mm | $d_h$ mm | $d_p$ mm | Prefilm width B (mm) | Film strip running speed m/min-in | Pinning bubbles No. | Mean radius |
|---|---|---|---|---|---|---|---|---|---|
| 1 | 5.8 | 0.95 | 70 | 70 | 65 | 248 | 100 | 427 | 32.4 |
| 2 | 6.5 | 1.4 | 70 | 70 | 65 | 248 | 100 | 466 | 21.3 |
| 3 | 6.5 | 1.6 | 70 | 70 | 60 | 247 | 100 | 290 | 13.8 |
| 4 | 6.5 | 1.8 | 70 | 70 | 60 | 248 | 100 | 271 | 14.6 |
| 5 | 7 | 2 | 70 | 70 | 60 | 250 | 100 | 168 | 13.1 |
| 6 | 5.5 | 1 | 70 | 70 | 60 | 223 | 120 | 673 | 25.0 |
| 7 | 6 | 1.4 | 70 | 70 | 60 | 225 | 120 | 681 | 19.6 |
| 8 | 6.2 | 1.6 | 70 | 70 | 60 | 227 | 120 | 671 | 19.2 |

Figure 6A:
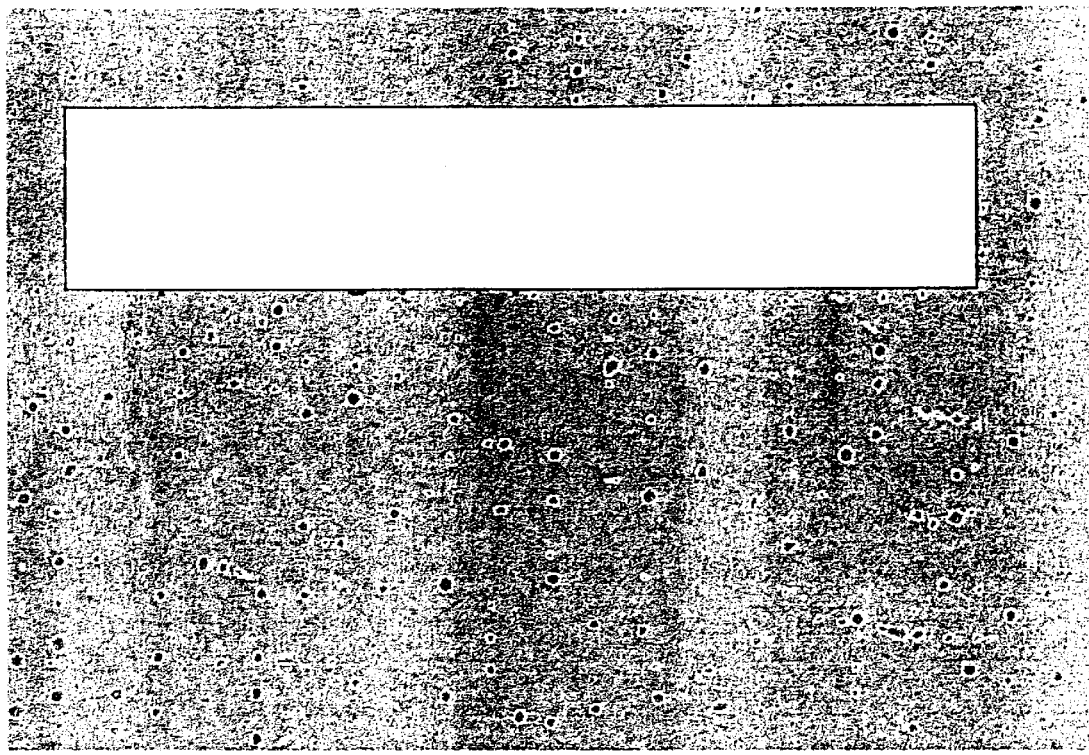
FIGS. 6a to 6d show photographs of films which were laid onto the take-off roll by means of a single metal-strip electrode and using a double strip made of two metal-strip electrodes, at two different film strip running speeds.
Figure 6B:
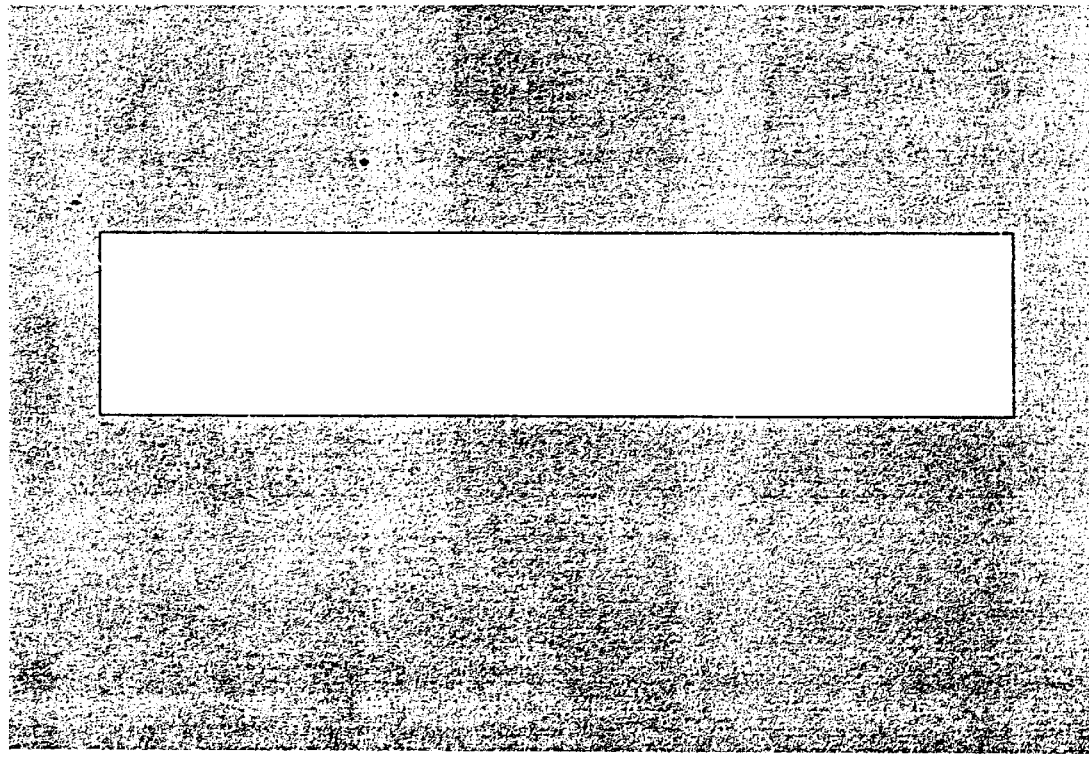
Figure 6C:
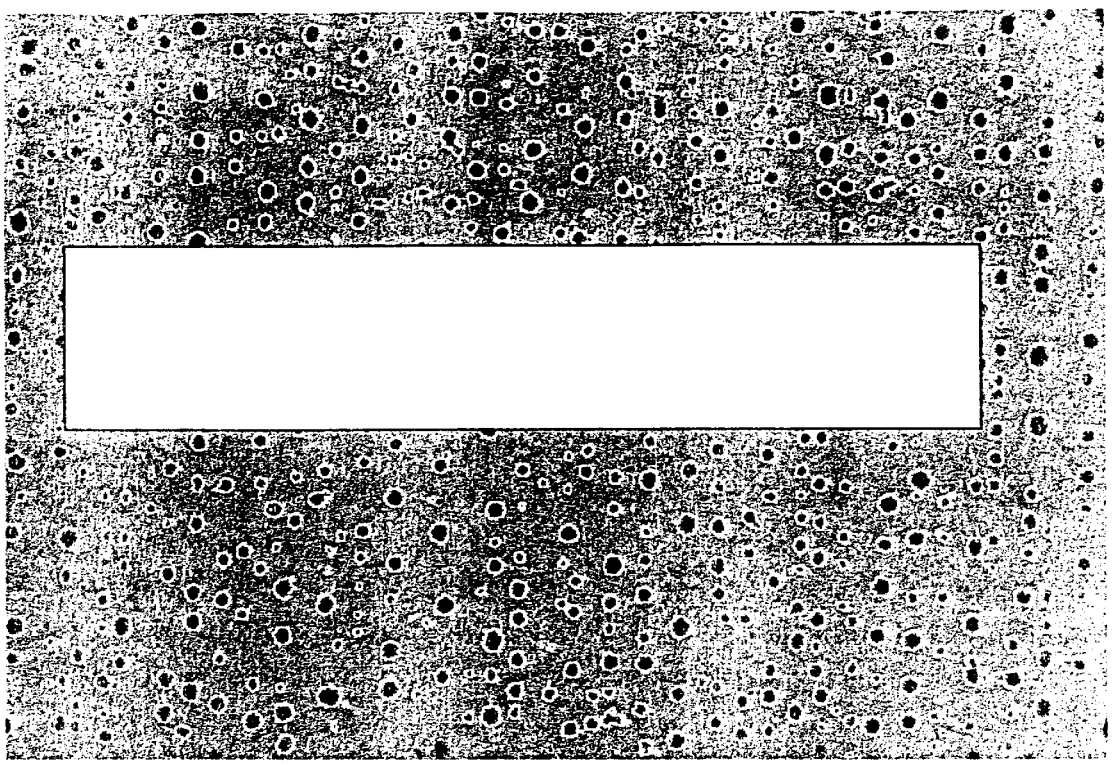
Figure 6D:
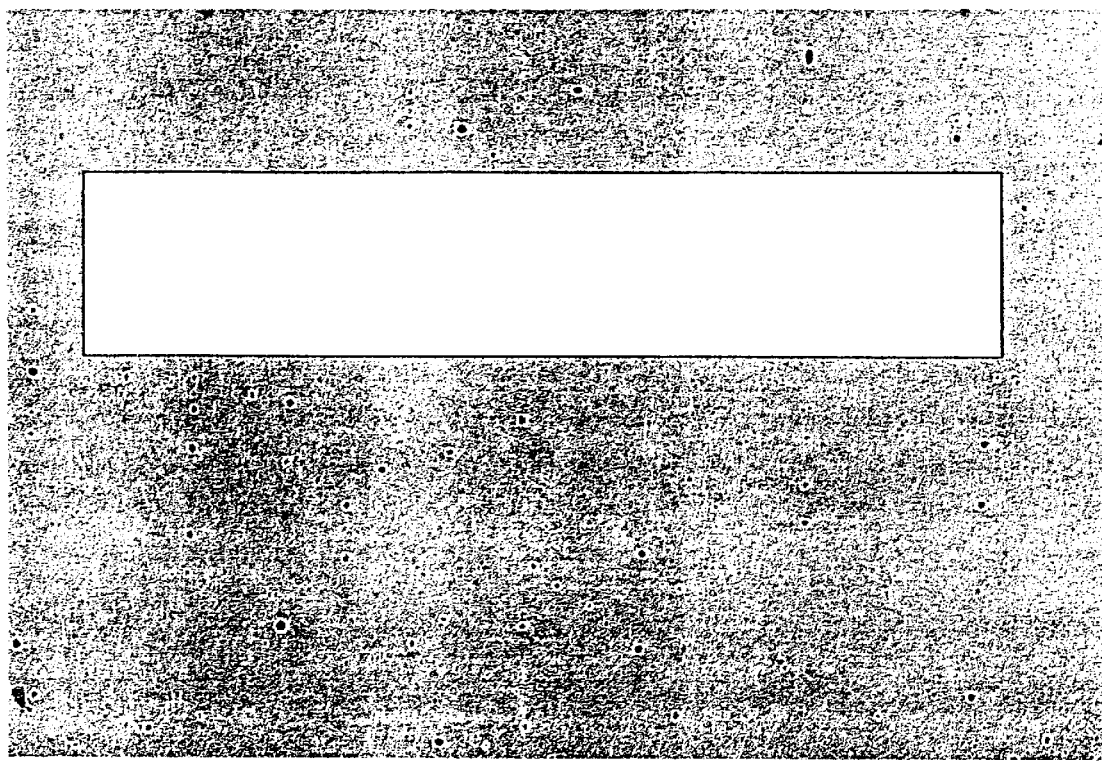

The values of Table 2 relate to the double strip 9 comprising two metal-strip electrodes 4 and 5 as laying device According to FIGS. 6c and 6d, the mean radii of the pinning bubbles are 19.2 μm and 11.8 μm, that is to say the

TABLE 2

| Sample # | Direct current | | $d_s$ | $d_h$ | $d_p$ | Prefilm width | Film strip running speed | Pinning bubbles | |
|---|---|---|---|---|---|---|---|---|---|
| | V (kV) | I (mA) | (mm) | (mm) | (mm) | B (mm) | (m/min) | No. | Mean radius (μm) |
| 9 | 7 | 1 | 70 | 70 | 65 | 254 | 100 | 600 | 20.2 |
| 10 | 6.5 | 1.4 | 70 | 70 | 65 | 252 | 100 | 42 | 11.72 |
| 11 | 6.8 | 1.6 | 70 | 70 | 65 | 250 | 100 | 12 | 10.6 |
| 12 | 7 | 1.8 | 70 | 70 | 65 | 250 | 100 | 4 | 10.1 |
| 13 | 7 | 2 | 70 | 70 | 65 | 252 | 100 | 2 | 9.2 |
| 14 | 6.8 | 1 | 70 | 70 | 65 | 244 | 120 | 459 | 26.7 |
| 15 | 7.2 | 1.4 | 70 | 70 | 65 | 246 | 120 | 579 | 20.5 |
| 16 | 7 | 1.6 | 70 | 70 | 65 | 228 | 120 | 151 | 11.8 |
| 17 | 6.5 | 1.8 | 70 | 70 | 65 | 239 | 120 | — | — |
| 18 | 6.8 | 2 | 70 | 70 | 65 | 228 | 120 | — | — |

At a film strip running speed of 100 m/min for the single metal-strip electrode, the high voltages applied lie in the range from 5.8 to 7 kV and the current intensities between 0.95 and 2 mA.

At a film strip running speed of 120 m/min, the high voltage is 5.5 to 6.2 kV and the current intensity 1 to 1.6 mA.

At a film strip running speed of 100 m/min, and given the employment of a double strip 9, the high voltages on the double strip lie between 6.5 and 7 kV and the current intensities at 1 to 2 mA. With the film strip running speed increasing to 120 m/min, a high voltage between 6.5 and 7.2 kV is applied to the double strip 9, and the current intensity is 1 to 2 mA. As the film strip running speeds increase further, the applied high voltage on the double strip 9 also increases, and preferred voltages that are applied to the double strip 9 lie in the range from 4 to 12 kV, in particular from 6.5 to 7.5 kV.

The geometries of the pinning bubbles of the samples 3 and 11 and 8 and 16, respectively, selected from Tables 1 and 2, are compared with one another in FIGS. 6a, 6b and 6c and 6d, respectively. According to FIGS. 6a and 6b, the mean radii of the pinning bubbles are 13.8 μm and 10.6 μm, which signifies a reduction of 23 to 23.2% of the mean bubble radius diameter when employing a double strip comprising two metal-strip electrodes instead of a single metal-strip electrode. Furthermore, it is obvious from the figures that not only does the mean radius of the bubbles but also the number of the pinning bubbles reduce sharply as a result of the additive electric field of the double strip, namely from 290 bubbles to 12 bubbles.

mean radius is around 38.5% to 39% smaller when employing a double strip as compared with a single metal-strip electrode.

The parameters of a laying device comprising a single metal-strip electrode, and a single metal-strip electrode in combination with an electrode according to the third embodiment of the invention according to FIG. 3 are compiled in Table 3. At a film strip running speed of 100 m/min, a high voltage of 6.8 to 7.0 kV is applied to the metal-strip electrode, and a current of 1.5 mA flows. In the case of a laying device comprising a metal-strip electrode and a further electrode, for example in the shape of an annular electrode, the high voltage on the metal-strip electrode is 6.8 kV, at a current of 1.4 mA. In this case, a high voltage of 6 kV is applied to the further electrode, the current is virtually zero.

Figure 7A:
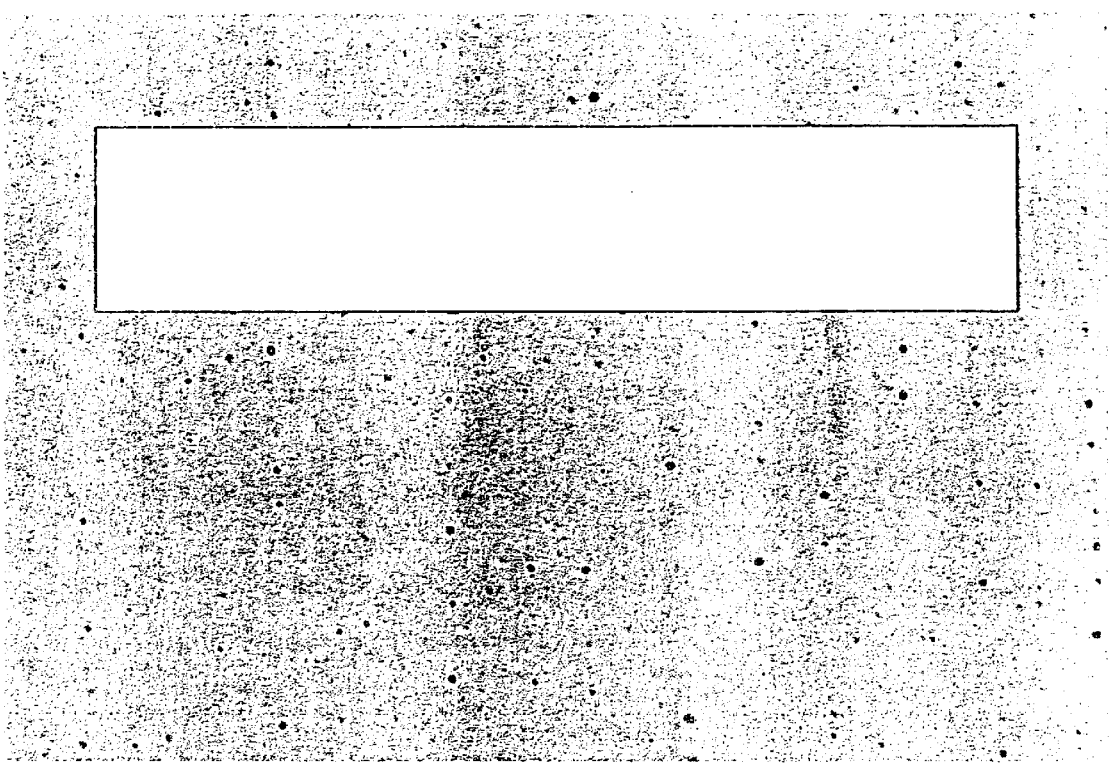
FIGS. 7a to 7d show photographs of films which were laid onto the take-off roll by means of a single metal-strip electrode, on the one hand, and using a metal-strip electrode in conjunction with an additional annular electrode or disk-shaped electrode, on the other hand, at the same film strip running speed.
Figure 7B:
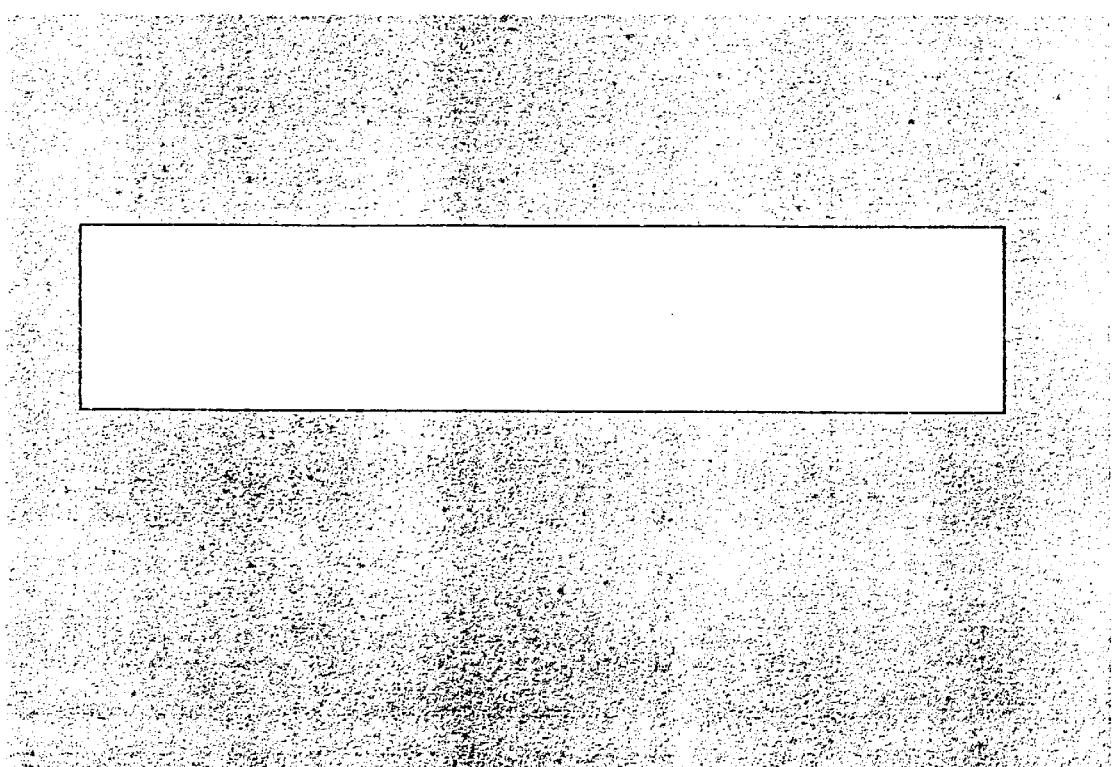

FIGS. 7a and 7b of the samples 20 and 21 from Table 3 show the geometries of the pinning bubbles. In FIG. 7a, the mean radius of the pinning bubbles is 12.4 μm, and in FIG. 7b this radius is 8.9 μm, that is to say the mean radius according to FIG. 7b is around 28.2% smaller than in FIG. 7a. The number of pinning bubbles is also smaller when employing the third embodiment for laying on the film 3 than in the case of a laying device which operates without an additional additive electric field. The number of pinning bubbles decreases from 113 to 7.

TABLE 3

| Sample # | Direct current metal strip | | Direct current electrode annular | | $d_s$ mm | $d_h$ mm | $d_p$ mm | Pre-film width B (mm) | Film strip running speed (m/min) | Pinning bubbles | |
|---|---|---|---|---|---|---|---|---|---|---|---|
| | V kV | I mA | V kV | I mA | | | | | | No. | Mean radius |
| 19 | 7 | 1.5 | — | — | 70 | 70 | 75 | 235 | 100 | — | — |
| 20 | 6.8 | 1.5 | 0 | — | 70 | 70 | 75 | 233 | 100 | 133 | 12.4 |
| 21 | 6.8 | 1.4 | 6 | 0 | 70 | 70 | 75 | 234 | 100 | 7 | 8.9 |

The values of Table 3 refer to a single metal-strip electrode and a metal-strip electrode in combination with further electrode as laying device.

TABLE 4

| | Direct current metal strip | | Direct current electrode disk-shaped | | | | | Pre-film width | Film strip running speed | Pinning bubbles | |
|---|---|---|---|---|---|---|---|---|---|---|---|
| Sample # | V kV | I mA | V kV | I mA | $d_s$ mm | $d_h$ mm | $d_p$ mm | mm | (m/min) | No | Mean radius ($\mu$m) |
| 22 | 6.0 | 1.4 | 0.0 | 0 | 70 | 70 | 65 | 201 | 100 | 541 | 13.4 |
| 23 | 6.0 | 1.25 | 6.0 | 0 | 70 | 70 | 65 | 207 | 100 | 113 | 12.0 |
| 24 | 6.0 | 1.2 | 10.0 | 0 | 70 | 70 | 65 | 212 | 100 | 124 | 11.8 |
| 25 | 7.0 | 2.0 | 0.0 | 0 | 70 | 70 | 65 | 204 | 100 | 238 | 11.7 |
| 26 | 7.0 | 1.9 | 6.0 | 0 | 70 | 70 | 65 | 206 | 100 | 112 | 11.5 |
| 27 | 7.0 | 1.85 | 10.0 | 0 | 70 | 70 | 65 | 209 | 100 | 179 | 11.2 |

The values of Table 4 relate to a single metal-strip electrode in combination with a disk-shaped electrode as laying device.

Figure 7C:
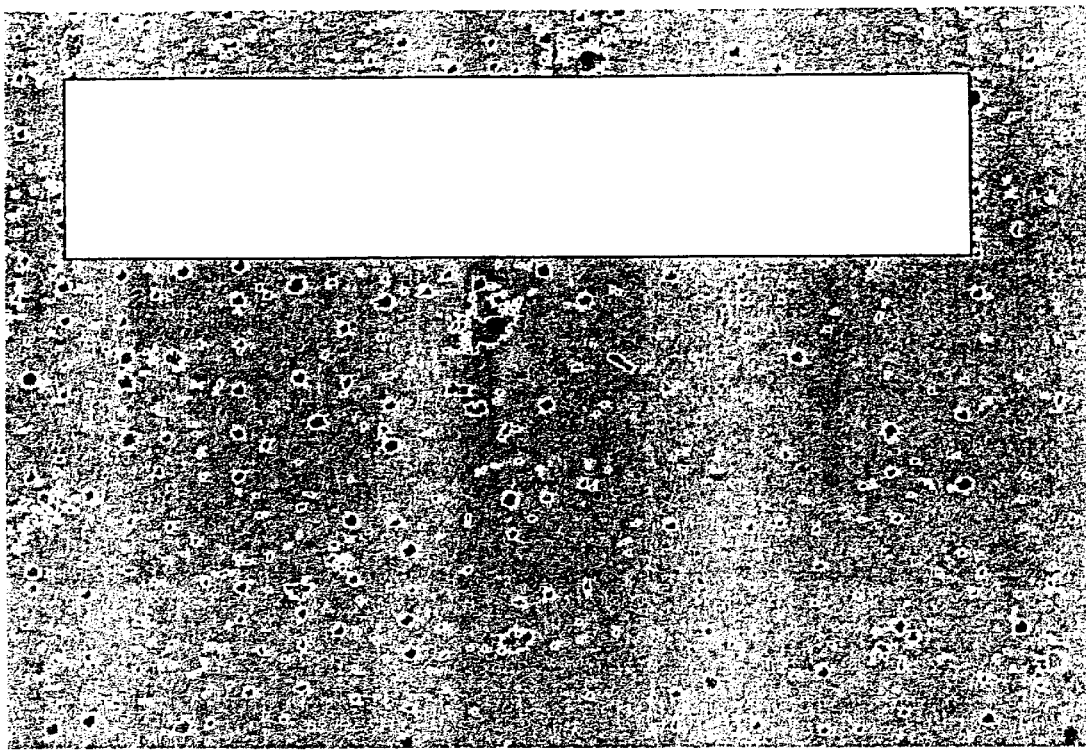
Figure 7D:
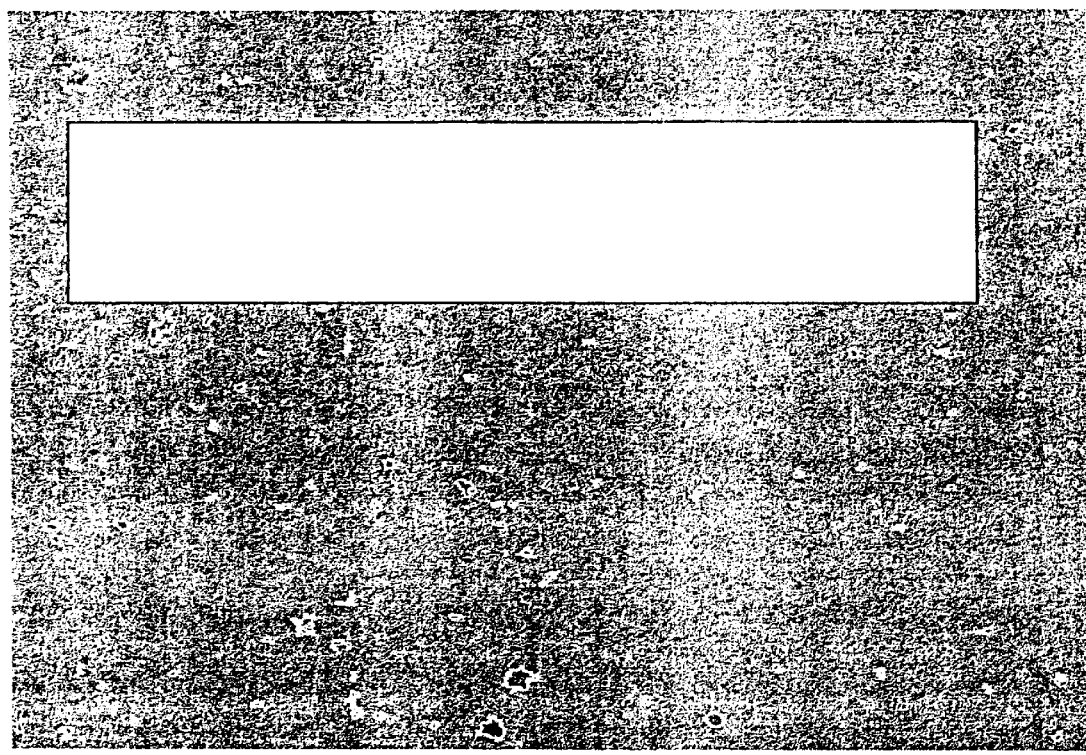

FIGS. 7c and 7d of samples 22 and 24 from Table 4 show the geometries of the pinning bubbles when employing a laying device comprising a single metal-strip electrode in combination with a disk-shaped electrode according to fifth embodiment of the invention according to FIG. 5. The film strip running speed is 100 m/min throughout, and a high voltage of 6.0 to 7.0 kV is applied to the metal-strip electrode, and a current of 1.2 to 2.0 mA flows, whereas the high voltage of the disk-shaped electrode is 0 to 10 kV and the direct current is virtually zero.

TABLE 5

| | Direct current metal strip | | Direct current disk-shaped electrode | | | | | Pref-film width | Film strip running speed | Pinning bubbles | |
|---|---|---|---|---|---|---|---|---|---|---|---|
| Sample # | V kV | I mA | V kV | I mA | $d_s$ mm | $d_h$ mm | $d_p$ mm | (mm) | (m/min) | No. | Mean radius ($\mu$m) |
| 28 | 5.8 | 1.0 | 0.0 | 0 | 70 | 70 | 65 | 200 | 100 | 69 | 11.7 |
| 29 | 5.8 | 0.95 | 6.0 | 0 | 70 | 70 | 65 | 202 | 100 | 35 | 11.8 |

The values of Table 5 refer to a double strip comprising two metal-strip electrodes and a double strip in conjunction with a disk-shaped electrode as laying device.

Figure 8A:
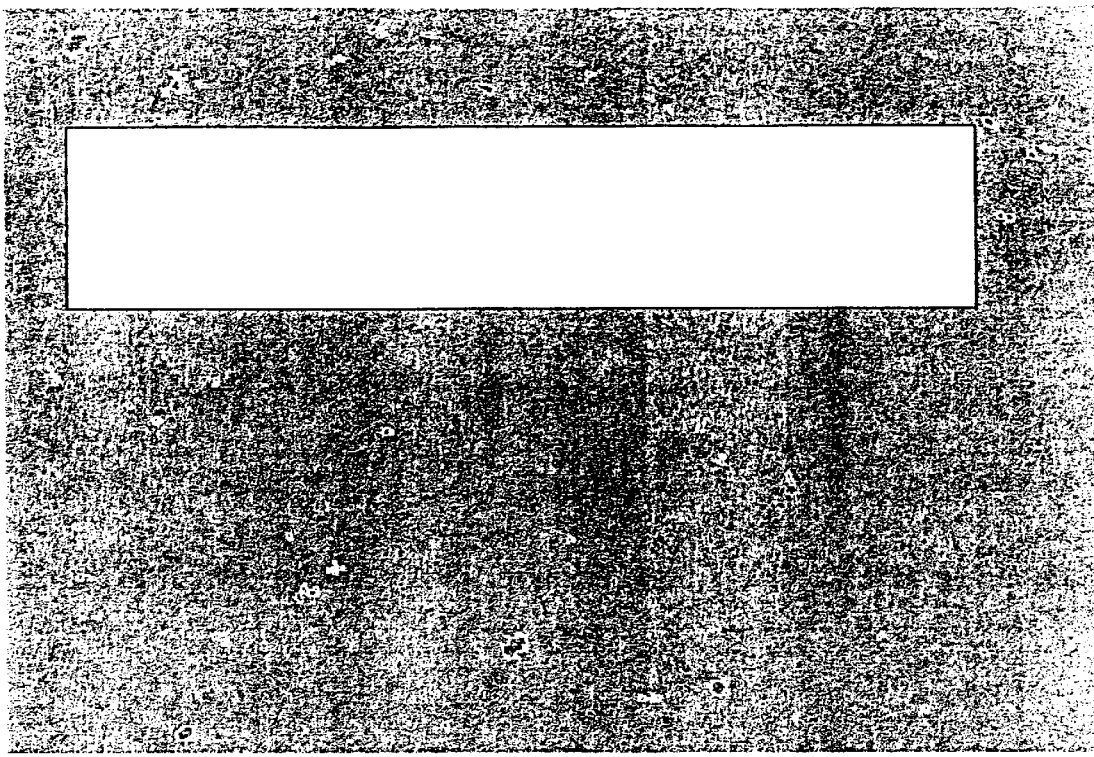
FIGS. 8a and 8b show photographs of films which were laid onto the take-off roll by means of a double strip made of two metal-strip electrodes, on the one hand, and using a double strip made of two metal-strip electrodes in conjunction with an additional disk-shaped electrode, on the other hand.
Figure 8B:
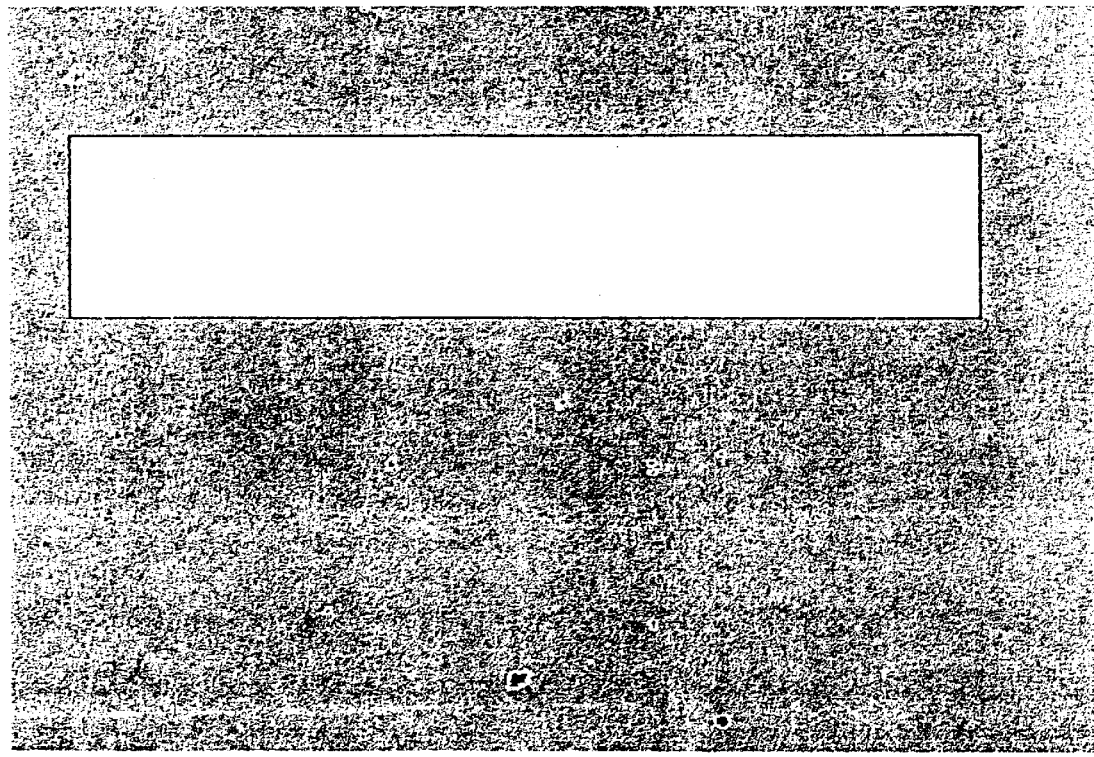

FIGS. 8a and 8b of samples 28 and 29 from Table 5 show in comparison the pinning bubbles when employing a laying device comprising a double strip 9 (cf. FIG. 1) and, respectively, a double strip 9 in conjunction with a disk-shaped electrode 16. The last laying device is not illustrated with a drawing; its configuration with respect to the dimensions, distances and the like corresponds to that of the embodiment according to FIG. 5, when a double strip 9 is provided instead of the single metal-strip electrode 4. The film strip running speed is 100 m/min in each case. The high voltage applied to the double strip 9 is 5.8 kV in both cases, whereas a high voltage of 6.0 kV is applied to the disk-shaped electrode. The number of pinning bubbles falls from 69 to 35 when the electric field of the disk-shaped electrode 16 is further added to the electric field of the double strip 9. The mean radius of the pinning bubbles in this case changes only slightly from 11.7 $\mu$m to 11.8$\mu$.

While the invention has been described herein with respect to several different embodiments, it will be appreciated that these are shown for purposes of example only and are not intended as being limiting to the invention. Other variations, modification, and application of the invention according to the principles described herein may be made.

I claim:

1. A device for laying a film emerging from a slot die onto a rotating take-off roll, comprising a slot die adapted for emergence of a film therefrom, a rotating take-off roll for the film emerging from said slot, and a first metal strip as a first electrode that is arranged parallel to and at a short distance from the surface of the take-off roll and to which electric voltage from a first power source is applied;

wherein, in addition to said first electrode, one or a plurality of additional electrodes are arranged at a distance from the surface of the take-off roll, have applied to them an electric voltage whose magnitude is the same as or different from that applied to the first electrode, and form additive electric fields to the electric field of the first electrode;

and wherein a second metal strip, which is of the same type as the first metal strip and to which an electric voltage from said first power source is applied, is arranged parallel to the first metal strip as a second electrode, the first and second metal strips forming a double strip and being connected to the same power source and in each case having a tapering strip edge that is directed toward the surface of the take-off roll.

2. The device as claimed in claim 1, wherein the distance between the strip edges of the first and second metal strips is 0.1 to 15 mm, and wherein the voltage applied to the double strip lies in the range from 4 to 12 kV.

3. The device as claimed in claim 1, wherein there is arranged above the double strip a third electrode, to which is applied an electric voltage from a second power source.

4. The device as claimed in claim 3, wherein the voltage applied to the third electrode lies in the range from about 5 kV to about 15 kV.

5. The device as claimed in claim 3, wherein the third electrode is an annular electrode of circular cross section, which has a diameter of 10 to 100 mm and wherein the third electrode is arranged 3 to 30 mm vertically above the point where the film is laid onto the take-off roll.

6. The device as claimed in claim 1, wherein the horizontal and vertical distances of the slot die from the vertex of the take-off roll are each in the range of about 15 to about 90 mm;
   wherein the axis of the slot die includes an angle between 20° and 40° with a vertical S through the vertex of the take-off roll, and
   wherein the take-off roll has a diameter of about 600 to about 1800 mm.

7. The device as claimed in claim 1, wherein the inclination of the double strip with respect to vertical S through the vertex of the take-off roll is 20° to 40°, and wherein the distance of the first metal strip, which lies closer to the vertical S, from the vertical S lies in the range from 30 to 100 mm.

8. The device as claimed in claim 1
   wherein a third electrode or a fourth electrode, to which a voltage additional to the electric voltage of the first metal-strip electrode is applied, is arranged between the slot die and said first metal strip electrode, and wherein the first metal strip electrode is located 3 to 30 mm vertically above the point where the film is laid onto the take-off roll.

9. The device as claimed in claim 8, wherein the voltage applied to the third electrode lies in the range from 5 kV to 15 kV.

10. The device as claimed in claim 9, wherein the third electrode is an annular electrode of circular cross section, which is arranged 3 to 30 mm vertically above the point where the film is laid onto the take-off roll, and
    wherein the diameter of the annular electrode is 10 to 100 mm.

11. The device as claimed in claim 8, wherein the fourth electrode is a disk-shaped electrode, which is screwed by means of a first cylindrical screw to an intermediate piece that is connected to a ribbed insulator which, with the aid of a second cylindrical screw, is fastened to a longer link piece, and
    wherein a shorter link piece is connected to a holder, which is mounted in a height-adjustable and horizontally adjustable carriage.

12. The device as claimed in claim 11, wherein a voltage of 5 to 15 kV is applied to the disk-shaped fourth electrode, and
    wherein the distance of the fourth electrode from the surface of the take-off roll is 3 to 30 mm.

13. The device as claimed in claim 1, wherein a fourth disk-shaped electrode is arranged above the double strip; and
    wherein a voltage in the range from 4 to 12 kV is applied to the double strip, and a voltage of 5 kV to 15 kV is applied to the disk-shaped electrode.

14. A device for laying a film emerging from a slot die onto a rotating take-off roll, comprising a slot die adapted for emergence of a film therefrom, a rotating take-off roll for the film emerging from said slot, and a first metal strip electrode that is arranged parallel to and a short distance from the surface of the take-off roll and to which electric voltage from a first power source is applied;
    wherein a third electrode or a fourth electrode, to which a voltage additional to the electric voltage of the first metal strip electrode is applied whose magnitude is the same as or different from that applied to the first metal strip electrode, is arranged at a distance from the surface of the take-off roll between the slot die and said first metal strip electrode and forms an additive electric field to the electric field of the first metal strip electrode, and wherein the first metal strip electrode is located 3 to 30 mm vertically above the point where the film is laid onto the take-off roll.

15. The device as claimed in claim 14, wherein the voltage applied to the third electrode lies in the range from 5 kV to 15 kV.

16. The device as claimed in claim 15, wherein the third electrode is an annular electrode of circular cross section, which is arranged 3 to 30 mm vertically above the point where the film is laid onto the take-off roll and wherein the diameter of the annular electrode is 10 to 100 mm.

17. The device as claimed in claim 14, wherein the fourth electrode is a disk-shaped electrode, which is screwed by means of a first cylindrical screw to an intermediate piece that is connected to a ribbed insulator which, with the aid of a second cylindrical screw, is fastened to a longer link piece, and
    wherein a shorter link piece is connected to a holder, which is mounted in a height-adjustable and horizontally adjustable carriage.

18. The device as claimed in claim 17, wherein a voltage of 5 to 15 kV is applied to the disk-shaped fourth electrode, and
    wherein the distance of the fourth electrode from the surface of the take-off roll is 3 to 30 mm.

19. A device for laying a film emerging from a slot die onto a rotating take-off roll, comprising a slot die adapted for the emergence therefrom of a film, a rotating take-off roll for the film emerging from the slot die, a first electrode connected to a first high voltage power source and arranged parallel to and a short distance from the surface of the take-off roll, and a further electrode, which is an annular electrode of circular cross section or a disk-shaped electrode, arranged at a distance from the surface of the take-off roll and connected to a separate, second source of high voltage power whose magnitude is the same as or different from that to which the first electrode is connected for forming an additive electric field to the electric field of the first electrode.

20. A device according to claim 19 wherein the first electrode is a metal strip having a tapered strip edge that is directed toward the surface of the take-off roll.

21. A device according to claim 20 wherein the further electrode is arranged between the slot die and the metal strip.

22. A device according to claim 21 wherein the further electrode is an annular electrode of circular cross section.

23. A device according to claim 22 wherein the further electrode has a diameter of 10 to 100 mm and is arranged 3 to 30 mm above the point where the film is laid onto the take-off roll.

24. A device according to claim 21 wherein the further electrode is a disk-shaped electrode.

25. A device according to claim 24 wherein the further electrode is located 3 to 30 mm perpendicularly above the point where the film is laid onto the take-off roll.

26. A device according to claim 25 wherein the further electrode is directly in front of the metal strip.

27. A device according to claim 26 wherein the further electrode is at a distance from the surface of the take-off roll which is adjustable within the range 3 to 12 mm.

28. A device according to claim 20 wherein the further electrode is an annular electrode of circular cross section.

29. A device according to claim 20 wherein the further electrode is a disk-shaped electrode.

30. A device according to claim 29 wherein the further electrode is located above the metal strip.

31. A device according to claim 30 wherein the further electrode is 15 to 30 mm from the surface of the take-off roll.

32. A device according to claim 5 wherein the third electrode has a diameter of 75 mm.

* * * * *